(12) United States Patent
Gharagozloo et al.

(10) Patent No.: US 12,630,294 B2
(45) Date of Patent: May 19, 2026

(54) METHOD AND APPARATUS FOR DETERMINING SERIES ARCING IN A HYBRID-ELECTRIC PROPULSION SYSTEM

(71) Applicant: Pratt & Whitney Canada Corp., Longueuil (CA)

(72) Inventors: Alireza Gharagozloo, Boucherville (CA); Michael Hanna, Beaconsfield (CA)

(73) Assignee: Pratt & Whitney Canada Corp., Longueuil (CA)

( * ) Notice: Subject to any disclaimer, the term of this patent is extended or adjusted under 35 U.S.C. 154(b) by 243 days.

(21) Appl. No.: 18/241,639

(22) Filed: Sep. 1, 2023

(65) Prior Publication Data

US 2025/0074606 A1 Mar. 6, 2025

(51) Int. Cl.
 B64D 27/24 (2024.01)
 *B60L 3/00* (2019.01)
 *B64D 27/02* (2006.01)

(52) U.S. Cl.
 CPC ............ B64D 27/24 (2013.01); *B60L 3/0069* (2013.01); *B60L 2200/10* (2013.01); *B60L 2260/46* (2013.01); *B64D 27/026* (2024.01)

(58) Field of Classification Search
 CPC ..... B64D 27/24; B64D 27/026; B60L 3/0069; B60L 2200/10; B60L 2260/46;
 (Continued)

(56) References Cited

U.S. PATENT DOCUMENTS

| | | | | |
|---|---|---|---|---|
| 5,359,293 | A | * | 10/1994 | Boksiner .............. H02H 1/0015 379/27.02 |
| 9,429,092 | B2 | | 8/2016 | Rosero |

(Continued)

FOREIGN PATENT DOCUMENTS

WO 2023272405 A1 1/2023

OTHER PUBLICATIONS

Dang Hoang-Long et al: "Identifying DC Series and Parallel Arcs Based on Deep Learning Algorithms", IEEE Access, [Online], vol. 10, Jul. 20, 2022 (Jul. 20, 2022), pp. 76386-76400, XP093241130.

(Continued)

*Primary Examiner* — Alvaro E Fortich
*Assistant Examiner* — Haidong Zhang
(74) *Attorney, Agent, or Firm* — Getz Balich LLC

(57) ABSTRACT

A hybrid-electric propulsion system is provided that includes a thermal engine, an electric motor, a battery, a battery management unit (BMU), an electrical distribution bus, an artificial intelligence (AI) model, and a monitoring system (MS) controller. The electrical distribution bus electrically connects the electric motor and the BMU. The MS controller is in communication with the AI model, the electric motor, the BMU, and a memory storing instructions. The instructions when executed cause the MS controller to: receive a first operational parameter from the BMU unit; control the AI model to produce a predicted first operational parameter utilizing at least one electric motor operating parameter; and determine the presence of series arcing within the electrical distribution bus using the first operational parameter and the predicted first operational parameter.

18 Claims, 4 Drawing Sheets

(58) Field of Classification Search
CPC ......... B60L 50/15; B60L 50/16; G01R 31/12;
G01R 31/1272; G01R 31/14; G01R
31/008
See application file for complete search history.

(56) References Cited

U.S. PATENT DOCUMENTS

| | | | |
|---|---|---|---|
| 11,615,656 B2 | 3/2023 | Soukhostavets | |
| 11,820,526 B2* | 11/2023 | Tamada | B64D 27/33 |
| 2009/0184717 A1* | 7/2009 | Ivan | G01R 19/16547 |
| | | | 361/87 |
| 2013/0226479 A1* | 8/2013 | Grosjean | G01R 31/52 |
| | | | 702/58 |
| 2020/0062413 A1 | 2/2020 | Feddersen | |
| 2023/0062548 A1 | 3/2023 | Channegowda | |
| 2023/0348053 A1* | 11/2023 | Clark | B64C 29/0025 |

OTHER PUBLICATIONS

Le Vu et al: "Series Arc Fault Detection and Localization in DC Distribution Based on Master Controller", 2020 IEEE Energy Conversion Congress and Exposition (ECCE), IEEE, Oct. 11, 2020 (Oct. 11, 2020), pp. 2499-2504, XP033850662.
EP Search Report for EP Patent Application No. 24197760.2 dated Jan. 30, 2025.

* cited by examiner

METHOD AND APPARATUS FOR DETERMINING SERIES ARCING IN A HYBRID-ELECTRIC PROPULSION SYSTEM

BACKGROUND OF THE INVENTION

1. Technical Field

The present disclosure relates to methods and apparatus for monitoring an electrical system within a hybrid-electric propulsion system or an electric propulsion system in general, and methods and apparatus for determining the presence of series arcing within the same in particular.

2. Background Information

Hybrid-electric and electric propulsion systems used in aircraft sometimes suffer from a phenomenon referred to as "series arcing", wherein electrical energy may intermittently jump a gap between two or more points within the same phase while the electrical energy remains connected to a load. Series arcing may at connection points (e.g., where there is poor mating at the connection point), or at a terminal board (e.g., where the terminal board is insufficiently tightened), or at a ground stud (e.g., where there is a loose connection), and the like. Series arcing can contribute to one or more of overheating, component damage, reduction in signal quality, decreased or sporadic performance of electrical equipment, and the like. Diagnosing series arcing can be difficult as the arcing may only occur when there is a vibration or a mechanical stress on the system. The present disclosure provides a method and system for addressing series arcing.

There is therefore a need for an improved system and method for determining the presence of series arcing within the electrical system of a hybrid-electric or electric propulsion system.

SUMMARY

According to an aspect of the present disclosure, a hybrid-electric propulsion system is provided that includes a thermal engine, an electric motor, a battery, a battery management unit (BMU), an electrical distribution bus, an artificial intelligence (AI) model, and a monitoring system (MS) controller. The electrical distribution bus electrically connects the electric motor and the BMU. The MS controller is in communication with the AI model, the electric motor, the BMU, and a non-transitory memory storing instructions. The instructions when executed cause the MS controller to: receive a first operational parameter from the BMU unit; control the AI model to produce a predicted first operational parameter, wherein the AI model produces the predicted first operational parameter utilizing at least one electric motor operating parameter; and determine the presence of series arcing within the electrical distribution bus using the first operational parameter and the predicted first operational parameter.

In any of the aspects or embodiments described above and herein, the first operational parameter from the BMU unit may be a battery output power rate.

In any of the aspects or embodiments described above and herein, the battery output power rate may be an electrical current value.

In any of the aspects or embodiments described above and herein, the electric motor operating parameter may be at least one of a torque value representative of torque produced by the electric motor or an electric motor shaft rotational speed value.

In any of the aspects or embodiments described above and herein, the AI model may produce the predicted first operational parameter further utilizing an aircraft power demand request value.

In any of the aspects or embodiments described above and herein, the AI model may produce the predicted first operational parameter further utilizing at least one of an aircraft altitude value, an aircraft ambient temperature value, or an aircraft weight value.

In any of the aspects or embodiments described above and herein, the AI model may be configured for machine learning and the AI Model may be trained.

In any of the aspects or embodiments described above and herein, the thermal engine and the electric motor may be configured to provide motive force to a propulsor.

In any of the aspects or embodiments described above and herein, the instructions when executed may cause the MS controller to produce an indicator, or a record of the presence of series arcing, or cause a HEP system portion to shut down, or any combination thereof, upon determination of the presence of series arcing within the electrical distribution bus.

According to an aspect of the present disclosure, a method for determining series arcing in an aircraft hybrid-electric propulsion (HEP) system is provided. The method includes: providing a HEP system having a thermal engine, an electric motor, a battery, a battery management unit (BMU), and an electrical distribution bus electrically connecting the electric motor and the BMU; providing a first operational parameter from the BMU unit to an artificial intelligence (AI) model; controlling the AI model to produce a predicted first operational parameter, wherein the AI model produces the predicted first operational parameter utilizing at least one electric motor operating parameter based on an operation of the electric motor; and determining the presence of series arcing within the electrical distribution bus using the first operational parameter and the predicted first operational parameter.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
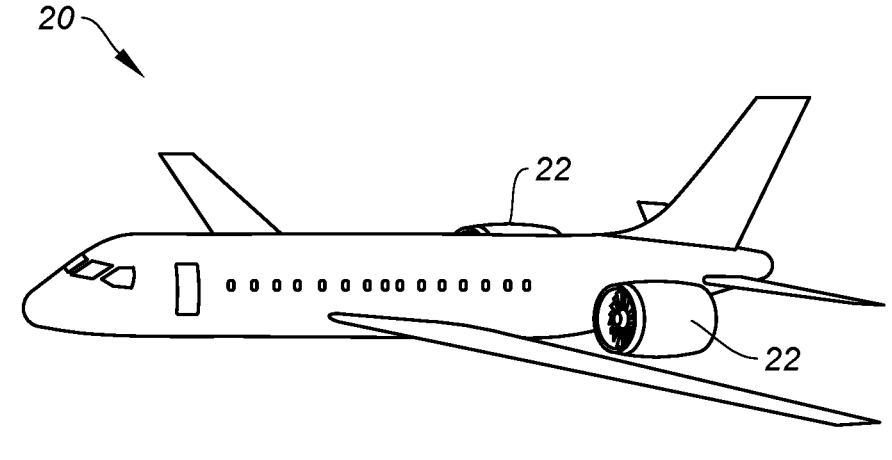
FIG. 1 is a diagrammatic representation of an aircraft powered by a hybrid-electric propulsion system.

FIG. 1 diagrammatically illustrates an example of an aircraft 20 that may be powered by a pair of hybrid-electric propulsion systems 22. The exemplary aircraft 20 shown is a fixed wing airplane. The present disclosure is not limited to use with a fixed-wing aircraft and may be used with other aircraft such as rotary-wing aircraft (e.g., a helicopter), tilt-rotor aircraft, tilt-wing aircraft, and the like. The aircraft may be a manned aerial vehicle or an unmanned aerial vehicle (UAV, e.g., a drone).

Figure 2:
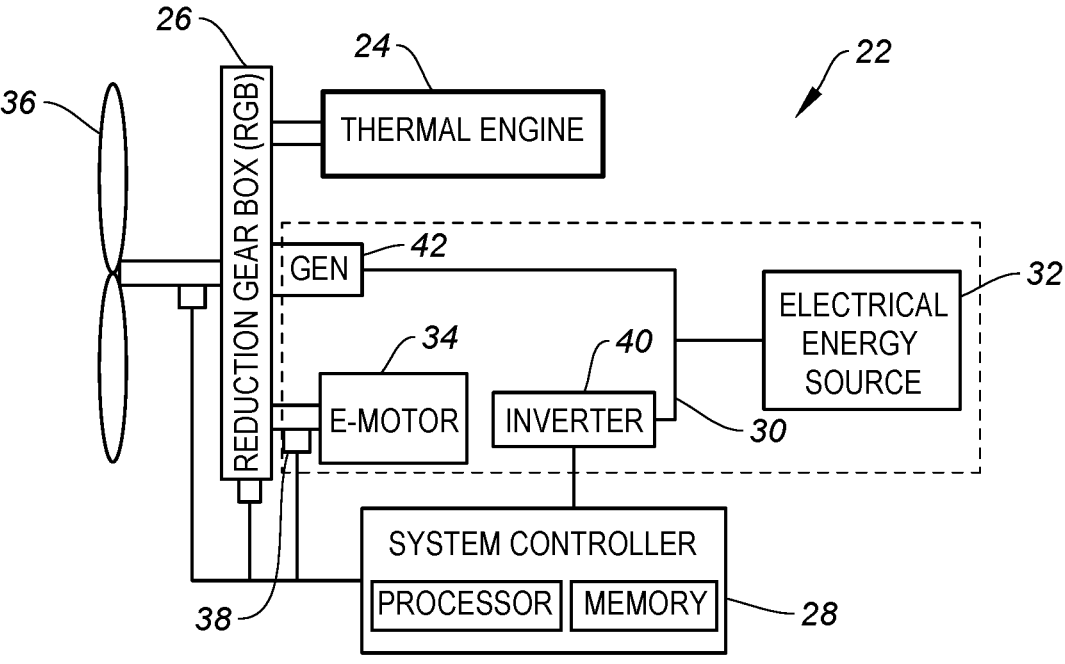
FIG. 2 is a diagrammatic representation of a hybrid-electric propulsion system.

FIG. 2 schematically illustrates a hybrid-electric propulsion system ("HEP system 22") embodiment. To facilitate the description herein, the description is directed toward only a HEP system 22. The present disclosure may be utilized with an electric propulsion system as well. The HEP system 22 includes a thermal engine 24, a reduction gear box 26, a system controller 28, an electrical distribution bus 30, an electrical energy source 32, an electric motor 34, a propulsor 36, and one or more sensors 38. The term "sensor" as used herein includes transducers or other devices config- ured to measure a parameter. A temperature sensor that is configured to measure ambient air temperature is an example of a transducer configured to measure a parameter. Alternatively, or in combination, a "sensor" may take the form of control logic configured to determine an operating parameter. An inverter 40 that is configured to determine an electric motor torque parameter is an example of a sensor utilizing control logic. Non-limiting examples of sensors 38 include an electric motor shaft rotation speed sensor, a shaft torque sensor, an accelerometer, a fuel flow sensor, and the like. In some embodiments, the HEP system 22 may include additional components including, but not limited to, an inverter 40, a generator 42, breakers, contactors, transform- ers, AC to DC conversion components, DC to AC conver- sation components, and the like. In the example shown in FIG. 2, the thermal engine 24 and the electric motor 34 are in communication with the reduction gear box 26 and are arranged in a parallel configuration. In this configuration, the thermal engine 24 or the electric motor 34, or both, provide motive force to the reduction gear box 26 and the reduction gear box 26, in turn, provides motive power to the propulsor 36. The HEP system 22 shown in FIG. 2 is provided to illustrate the utility of the present disclosure and the present disclosure is not limited thereto.

The thermal engine 24 may be a gas turbine engine, a rotary engine, a piston engine, a rotating detonation engine, or another type of combustion engine. In those embodiments wherein the thermal engine 24 is a gas turbine engine, the gas turbine engine may take the form of a turboprop engine, a turboshaft engine, a turbojet engine, a propfan engine, or an open rotor engine, or the like.

The propulsor 36 may be any type of device (e.g., propellers, fan blades, rotor blades for a helicopter, a tilt- rotor aircraft, or a tilt-wing aircraft) that can be rotated to provide motive thrust.

The system controller 28 may include one or more processors connected in signal communication with a memory device. The processor may include any type of computing device, computational circuit, processor(s), CPU, computer, or the like capable of executing a series of instructions that are stored in the memory. Instructions can be directly executable or can be used to develop executable instructions. For example, instructions can be realized as executable or non-executable machine code or as instruc- tions in a high-level language that can be compiled to produce executable or non-executable machine code. In addition, instructions also can be realized as or can include data. Computer-executable instructions also can be orga- nized in any format, including routines, subroutines, pro- grams, data structures, objects, modules, applications, app- lets, functions, etc. The instructions may include an operating system, and/or executable software modules such as program files, system data, buffers, drivers, utilities, and the like. The executable instructions may apply to any functionality described herein. The memory may include a single memory device or a plurality of memory devices; e.g., a computer-readable storage device that can be read, written, or otherwise accessed by a general purpose or special purpose computing device, including any processing elec- tronics and/or processing circuitry capable of executing instructions. The present disclosure is not limited to any particular type of memory device, which may be non- transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the system control- ler 28. The system controller 28 may include, or may be in communication with, an input device that enables a user to enter data and/or instructions, and may include, or be in communication with, an output device configured, for example to display information (e.g., a visual display or a printer), or to transfer data, etc. Communications between the system controller 28 and other electrical and/or elec- tronic components (e.g., controllers, sensors, etc.) may be via a hardwire connection or via a wireless connection. A person of skill in the art will recognize that portions of the system controller 28 may assume various forms (e.g., digital signal processor, analog device, etc.) capable of performing the functions described herein.

The electrical energy source 32 may be configured as an electrical power storage device that can be charged and discharged, or may be configured solely as a source of electrical energy. A non-limiting example of an electrical energy source 32 that can be charged and discharged is a battery. The battery may be a single battery, or a plurality of battery modules (e.g., battery packs), battery cells, and/or the like electrically connected together in series and/or parallel as necessary to configure the battery with the desired electrical characteristics (e.g., voltage output, current output, storage capacity, etc.). The present disclosure is not limited to any particular battery configuration and the term "battery" will be used hereinafter to include any such configuration unless otherwise indicated. A non-limiting example of an electrical energy source 32 configured solely as a source of electrical power is a fuel cell.

Figure 3:
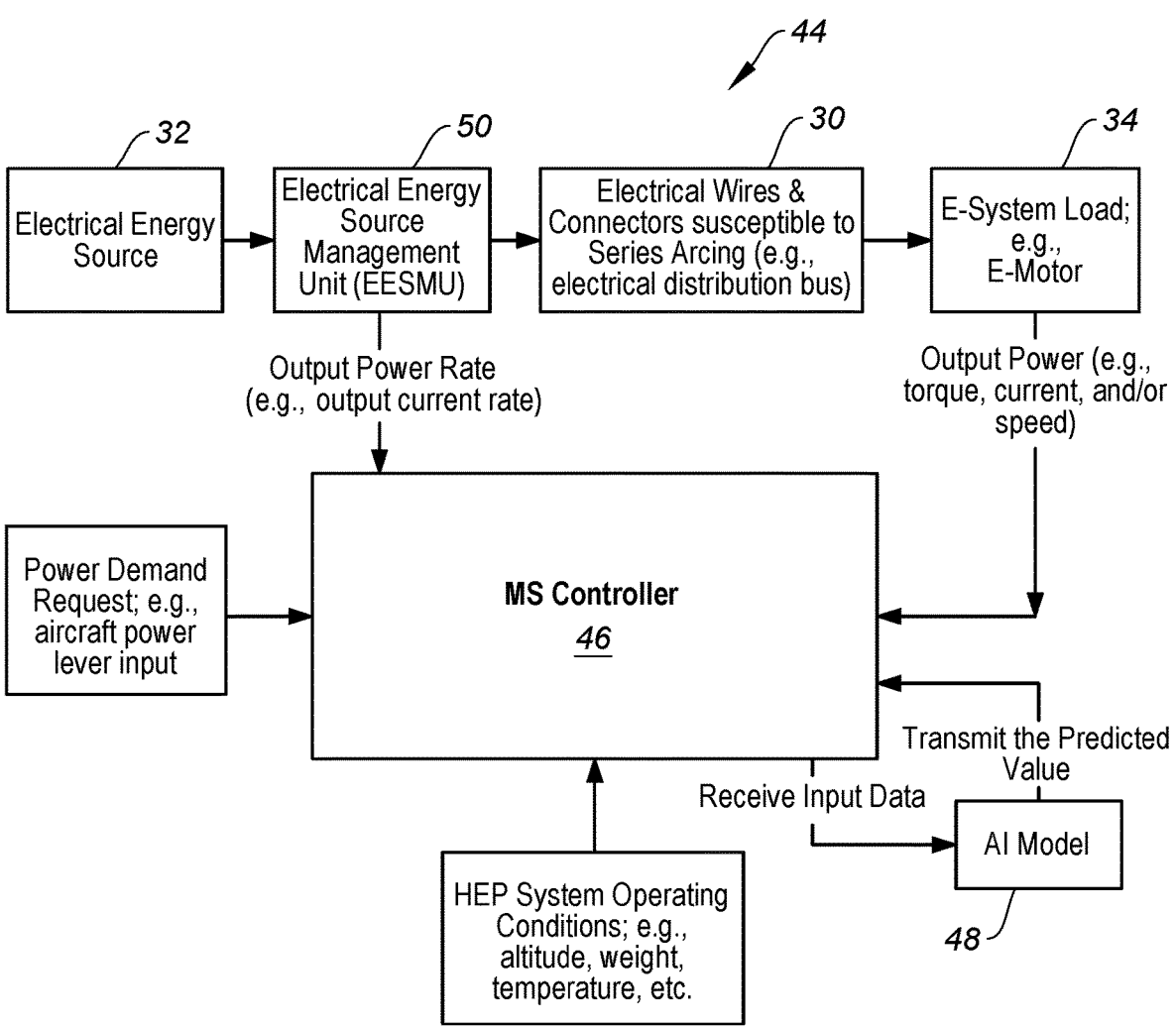
FIG. 3 is a schematic representation of a present disclosure system embodiment for identifying the presence of series arcing within an aircraft.

FIG. 3 shows a schematic of a present disclosure moni- toring system (MS) 44 embodiment configured to determine the presence of series arcing within an aircraft. The moni- toring system 44 includes a controller ("MS controller 46") and an artificial intelligence model ("AI Model 48"). The monitoring system 44 embodiment is schematically shown in communication with an electrical energy source 32, a battery management unit 50 (shown in FIG. 3 as an EESMU), electrical wires and connectors (i.e., electrical distribution bus 30), an electrical system load (e.g., electric motor 34), and various HEP system 22/aircraft inputs. The present disclosure monitoring system 44 is not limited to these particular system components and/or communication inputs.

The term "series arcing" as used herein refers to electrical energy that intermittently jumps a gap between two or more points within the same phase while the electrical energy remains connected to a load; i.e., the load is not bypassed. Series arcing may at connection points (e.g., where there is poor mating at the connection point), or at a terminal board (e.g., where the terminal board is insufficiently tightened), or at a ground stud (e.g., where there is a loose connection), and the like. Series arcing can contribute to one or more of overheating, component damage, reduction in signal quality, decreased or sporadic performance of electrical equipment, and the like. Diagnosing series arcing can be difficult as the arcing may only occur when there is a vibration or a mechanical stress on the system. The present disclosure provides a method and system for addressing series arcing.

The AI Model 48 is configured to utilize artificial intelligence to predict one or more HEP system 22 operational parameters. The artificial intelligence, which may utilize machine learning, utilizes one or more trained algorithms configured to predict an operational parameter value based on input data. The training process involves the input of known data into the algorithm, and the algorithm produces a predicted operating parameter value based on that input data. The predicted parameter value is evaluated relative to an actual value of the operating parameter (i.e., a "target value") based on the same input data. The training process may be repetitively performed using a statistically significant size of input data until the algorithm is "trained" (e.g., via weighting or bias values) to produce a predicted value operating parameter value that is in agreement (e.g., within a predetermined deviation range) with the actual operating parameter value. Once trained, the AI Model 48 provides a tool to predict what an operating parameter value should be based on input data. There are a variety of different known AI Models, including those that utilize machine learning and those that do not, that may be used with the present disclosure system. For those that use machine learning, there are several different training models that can be used to achieve a trained AI Model; e.g., supervised machine learning models, unsupervised machine learning models, reinforcement machine learning models, and the like. The present disclosure is not limited to any particular AI Model and does not require machine learning. If the AI Model 48 does include machine learning, the present disclosure is not limited to any particular machine learning model.

The MS controller 46 may be configured in a manner similar to that described above with regard to the system controller 28. In some embodiments, the MS controller 46 may be independent of the system controller 28 of a HEP system 22, or the MS controller 46 may be partially or completely integrated into the system controller 28 of a HEP system 22.

The configuration of the electrical energy source management unit (EESMU 50) will likely vary depending on the configuration of the electrical energy source; e.g., an EESMU 50 for a fuel cell will be different from an EESMU 50 for a battery-type electrical energy source. The configuration of an EESMU 50 may also vary for battery-type electrical energy sources, depending on the configuration of the batteries within the electrical energy source, the type of batteries, and so on. In terms of an EESMU 50 for a battery-type electrical energy source (which EESMU 50 may also be referred to as a "battery management unit" or "BMU"), the EESMU 50 will typically be configured (e.g., with sensors, a controller, and the like) to monitor operating parameters of the battery-type electrical energy source; e.g., voltage (total voltage, voltage of individual cells, voltage of periodic taps, etc.), temperature (average temperature, coolant intake or output temperatures, temperatures of individual cells, etc.), state of health ("SoH"—the remaining capacity of the battery as a function of the original capacity), state of charge ("SoC"—charge level of the battery), state of power ("SoP"—the amount of power available for a defined time interval), maximum charge current as a charge current limit (CCL), maximum discharge current as a discharge current limit (DCL), and the like. The EESMU 50 may be configured to control discharging and charging of the battery. As an example, FIG. 3 illustrates the EESMU 50 providing an output power rate (e.g., output current rate) to the MS controller 46. The EESMU 50 may be an independent device (e.g., independent of the MS controller 46 or the system controller 28), or it may be integrated into another controller; e.g., the system controller 28. Alternatively, the EESMU 50 may be integrated into an inverter 40, or an inverter 40 may be configured to perform the functions of the EESMU 50. In some embodiments, the inverter 40 may be partially or completely integrated into the system controller 28.

The "electrical wires and connectors susceptible to series arcing" represents electrical transmission hardware (e.g., wires or other electrical conduits and connectors-generically referred to herein as an "electrical distribution bus 30") through which electrical energy can pass from the electrical energy source 32 to the load 34.

An example of a "load" is the electric motor 34 shown in FIG. 2 used to provide motive force in the HEP system 22. The present disclosure is not limited to a load in the form of an electric motor 34 that provides motive force; e.g., an HEP system 22 may include other components that provide a load on the electrical system.

An example of operation of the present disclosure monitoring system is described hereinafter. To facilitate the description, the electrical energy source 32 will be described as a battery (and referred to as battery 32 to facilitate the description) and the electrical energy source management unit (EESMU 50) will be described as a battery management unit (BMU—and referred to as BMU 50 to facilitate the description). The present disclosure is not limited to this example.

During operation of a HEP system 22 that includes a present disclosure monitoring system, the HEP system 22 is configured to draw electrical energy from the battery 32. The BMU 50 manages the discharging of power from the embodiment and reports one or more operational parameters (e.g., the output current rate of the battery 32) to the MS controller 46. The electrical energy produced by the battery 32 is supplied to the electrical load; e.g., the HEP system 22 electric motor 34 shown in FIG. 2. Between the BMU 50 and the load 34, the power from the battery 32 will pass through components (e.g., an inverter 40) and an electrical distribution bus 30. Input signals from the load 34 (e.g., from sensors and/or control logic functioning as a sensor) will communicate operational parameters to the MS controller 46; e.g., output power parameters such as motor torque, current, motor rotational speed and the like produced by the load 34.

Figure 4:
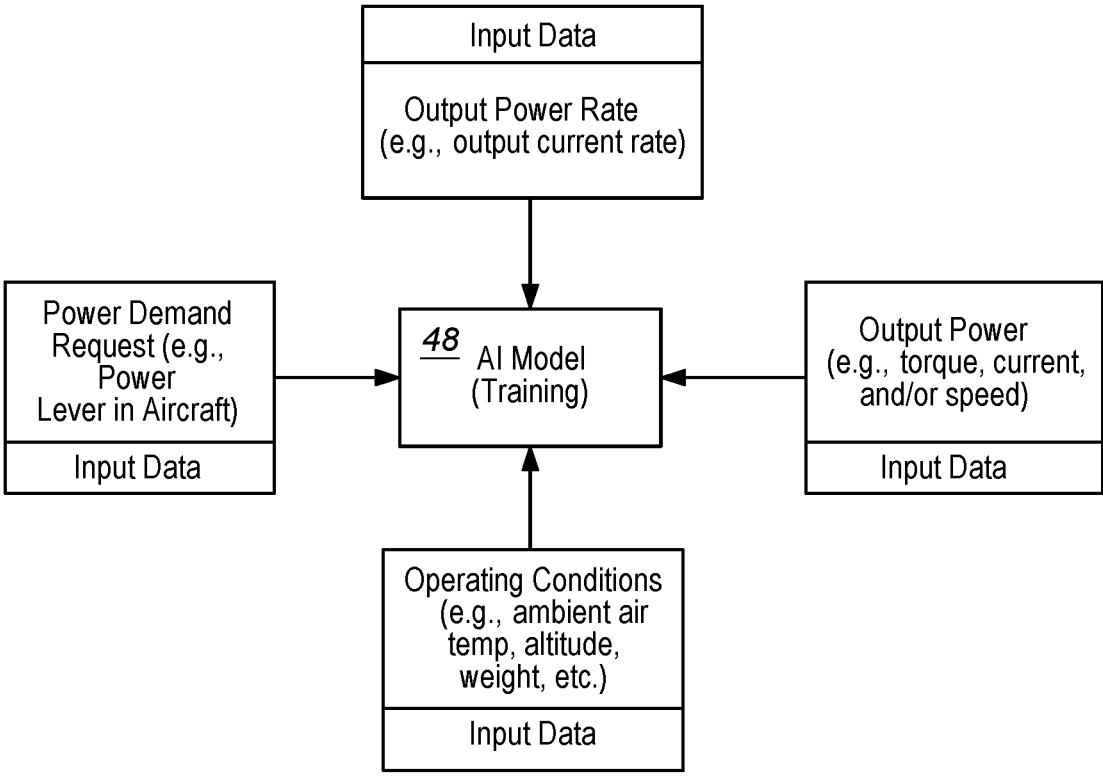
FIG. 4 is a schematic representation of a present disclosure system for training an AI Model.

In this example, the AI Model 48 is configured to produce one or more predicted operational parameters values that are in turn used to determine the presence of series arcing; e.g., one or more predicted values for output power parameters such as motor torque, current, motor rotational speed and the like produced by the load 34. The AI Model 48 algorithm has been trained using data that is relevant to determining the presence of series arcing; e.g., power demand request value, battery output power rate, electric motor 34 output power parameters (e.g., motor torque, current, rotational speed, and the like), and HEP system 22 operating parameters (e.g., ambient air temperature, altitude, aircraft weight, and the like). FIG. 4 schematically illustrates examples of input data that may be used in the AI Model 48 training process.

Figure 5:
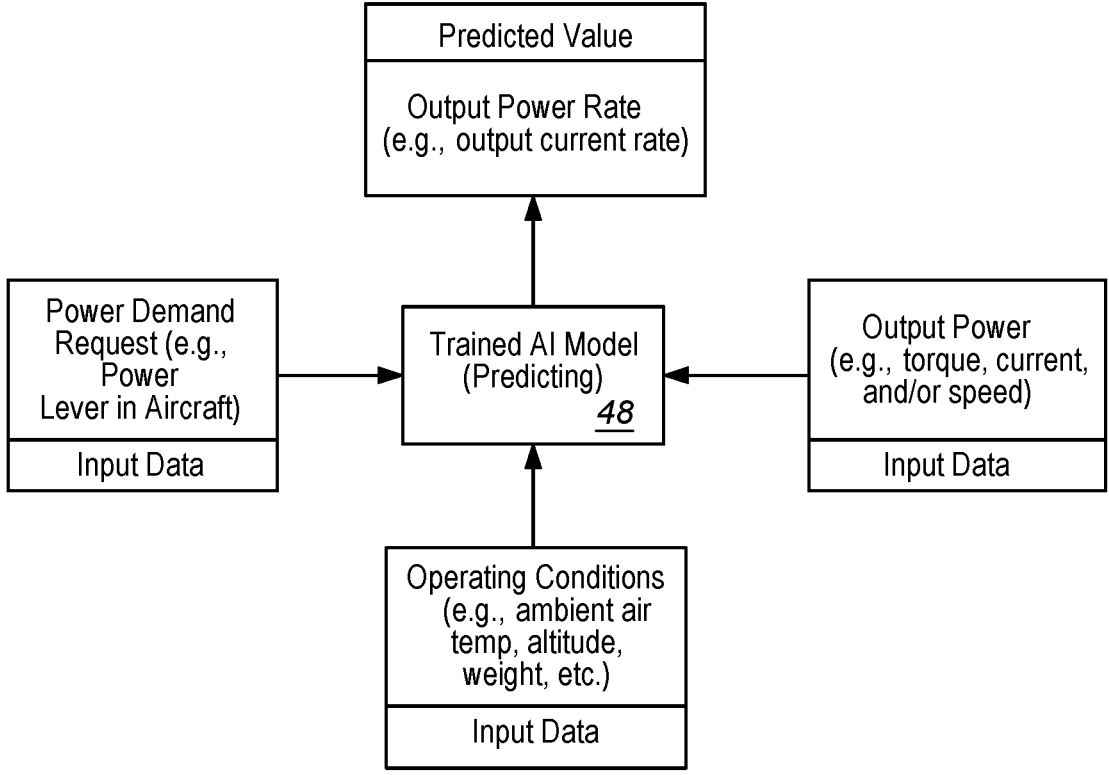
FIG. 5 is a schematic representation of a present disclosure system for inputting data into a trained AI Model and outputting data from the trained AI Model.

FIG. 5 schematically illustrates examples of input data that may be input into the trained AI Model 48 to produce the predicted operational parameter(s). As can be seen in FIGS. 4 and 5, the input data used to predict an operational parameter may be the same types of operational parameter data used to train the AI Model 48; e.g., see FIG. 4. The trained AI Model 48 utilizes the input data to produce a predicted operational parameter value. The MS controller 46 is configured (e.g., via stored instructions) to determine an actual value of the operational parameter, and to evaluate the determined actual value versus the AI Model 48 predicted operational parameter value; e.g., evaluate the output current rate of the battery 32 from the BMU 50 versus the AI Model 48 predicted operational parameter value. It should be noted that the output current rate of the battery 32 from the BMU 50 provided to the MS controller 46 is "upstream" of the electrical distribution bus 30 that potentially has series arcing. The electric motor 34 load (and the output power operational parameters it produces) is downstream of the electrical distribution bus 30. Hence, the output power operational parameters from the electric motor 34 load (which are provided to the AI Model 48 to produce the predicted value) may be influenced by any series arcing that may be present within the electrical distribution bus 30. In the absence of series arcing, the actual and predicted values of the operational parameter will be in agreement (e.g., within a predetermined deviation range). If series arcing is present (and is sufficiently significant), the actual and predicted values of the operational parameter may deviate from one another in an amount that is beyond a predetermined threshold, or outside a predetermined deviation range. In this manner, the AI Model 48 predicted operational parameter value can be used to determine the possibility of series arcing. Based on the evaluation (e.g., comparison) between actual and predicted parameter values, the present disclosure monitoring system 44 may be configured to take one or more responsive actions. For example, the present disclosure monitoring system 44 may provide information to the HEP system 22 operator regarding the potential presence of series arcing. The information may take a variety of different forms; e.g., visual indicators, audible indicators, recorded indications available for subsequent review, and the like, and any combination thereof. As another example of a responsive action, the present disclosure monitoring system 44 may shutdown (or cause to be shutdown) a HEP system 22 portion in view of the series arcing determination; e.g., the HEP system 22 and/or the monitoring system 44 may include one or more safety thresholds, and if the difference between the actual and predicted values of the operational parameter exceeds the safety threshold, the responsive action may include shutting down a HEP system 22 portion. The above described responsive actions are provided as illustrative examples and the present disclosure system is not limited thereto.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A hybrid-electric propulsion (HEP) system, comprising:
   a thermal engine;
   an electric motor;
   a battery;
   a battery management unit (BMU);
   an electrical distribution bus electrically connecting the electric motor and the BMU;
   an artificial intelligence (AI) model;
   a monitoring system (MS) controller in communication with the AI model, the electric motor, the BMU, and a non-transitory memory storing instructions, which instructions when executed cause the MS controller to:
   receive a first operational parameter from the BMU unit;
   control the AI model to produce a predicted first operational parameter, wherein the AI model produces the predicted first operational parameter utilizing at least one electric motor operating parameter; and
   determine a presence of series arcing within the electrical distribution bus using the first operational parameter and the predicted first operational parameter; and
   wherein the instructions when executed cause the MS controller to cause a HEP system portion to shut down upon determination of the presence of series arcing within the electrical distribution bus.

2. The hybrid-electric propulsion system of claim 1, wherein the first operational parameter from the BMU unit is a battery output power rate.

3. The hybrid-electric propulsion system of claim 2, wherein the battery output power rate is an electrical current value.

4. The hybrid-electric propulsion system of claim 2, wherein the electric motor operating parameter is at least one of a torque value representative of torque produced by the electric motor or an electric motor shaft rotational speed value.

5. The hybrid-electric propulsion system of claim 1, wherein the AI model produces the predicted first operational parameter further utilizing an aircraft power demand request value.

6. The hybrid-electric propulsion system of claim 5, wherein the AI model produces the predicted first operational parameter further utilizing at least one of an aircraft altitude value, an aircraft ambient temperature value, or an aircraft weight value.

7. The hybrid-electric propulsion system of claim 1, wherein the AI model is configured for machine learning and the AI Model is trained.

8. The hybrid-electric propulsion system of claim 1, wherein the thermal engine and the electric motor are configured to provide motive force to a propulsor.

9. The hybrid-electric propulsion system of claim 1, wherein the instructions when executed cause the MS controller to produce an indicator upon determination of the presence of series arcing within the electrical distribution bus.

10. The hybrid-electric propulsion system of claim 1, wherein the instructions when executed cause the MS controller to produce a record of the presence of series arcing upon determination of the presence of series arcing within the electrical distribution bus.

11. A method for determining series arcing in an aircraft hybrid-electric propulsion (HEP) system, comprising:
   providing a HEP system having a thermal engine, an electric motor, a battery, a battery management unit (BMU), and an electrical distribution bus electrically connecting the electric motor and the BMU;
   providing a first operational parameter from the BMU unit to an artificial intelligence (AI) model;
   controlling the AI model to produce a predicted first operational parameter, wherein the AI model produces the predicted first operational parameter utilizing at least one electric motor operating parameter based on an operation of the electric motor; and
   determining a presence of series arcing within the electrical distribution bus using the first operational parameter and the predicted first operational parameter; and
   further including shutting down a HEP system portion upon determination of the presence of series arcing within the electrical distribution bus.

12. The method of claim 11, wherein the first operational parameter from the BMU unit is a battery output power rate.

13. The method of claim 11, wherein the electric motor operating parameter is at least one of a torque value representative of torque produced by the electric motor or an electric motor shaft rotational speed value.

14. The method of claim 11, wherein the AI model is controlled to produce the predicted first operational parameter further utilizing at least one of an aircraft power demand request value, an aircraft altitude value, an aircraft ambient temperature value, or an aircraft weight value.

15. The method of claim 11, wherein the AI model is configured for machine learning and the AI Model is trained.

16. The method of claim 11, wherein the thermal engine and the electric motor are configured to provide motive force to a propulsor.

17. The method of claim 11, further including producing an indicator upon determination of the presence of series arcing within the electrical distribution bus.

18. The method of claim 11, further including producing a record of the presence of series arcing upon determination of the presence of series arcing within the electrical distribution bus.

* * * * *